(12) United States Patent
Mizumoto et al.

(10) Patent No.: US 12,669,404 B2
(45) Date of Patent: Jun. 30, 2026

(54) INSPECTING UNIT

(71) Applicant: DISCO CORPORATION, Tokyo (JP)

(72) Inventors: Yuta Mizumoto, Tokyo (JP); Kenji Narita, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 77 days.

(21) Appl. No.: 18/975,130

(22) Filed: Dec. 10, 2024

(65) Prior Publication Data

US 2025/0231080 A1     Jul. 17, 2025

(30) Foreign Application Priority Data

Jan. 11, 2024    (JP) ................................. 2024-002439

(51) Int. Cl.
*G01M 11/02*          (2006.01)
(52) U.S. Cl.
CPC ............................... *G01M 11/0207* (2013.01)
(58) Field of Classification Search
CPC ............. G01M 11/0207; B23K 26/082; B23K 26/359; B23K 26/38
See application file for complete search history.

(56) References Cited

U.S. PATENT DOCUMENTS

| | | | | |
|---|---|---|---|---|
| 12,472,585 | B2 * | 11/2025 | Ikku | ................... B23K 26/0823 |
| 2022/0118547 | A1 * | 4/2022 | Ohkubo | ............... B23K 26/032 |

FOREIGN PATENT DOCUMENTS

| | | |
|---|---|---|
| JP | 2001358093 A | 12/2001 |
| JP | 2011067840 A | 4/2011 |

* cited by examiner

*Primary Examiner* — Kevin K Pyo
(74) *Attorney, Agent, or Firm* — Greer Burns & Crain Ltd.

(57)          ABSTRACT

An inspecting unit for use in a laser processing apparatus includes a camera configured to image a spot of a laser beam, and a processing unit configured to generate a light intensity at two-dimensional X-Y coordinates corresponding to a two-dimensional image imaged by the camera. The processing unit includes a determining unit configured to generate a three-dimensional approximate curve or an approximate curved surface such that the light intensity corresponding to the two-dimensional coordinates is set as a Z-coordinate, and determine that there is dirt, a flaw, or an abnormality in an optical system on an optical path on the laser oscillator side of a position at which the spot is imaged when a difference between the first light intensity of the Z-coordinate corresponding to the two-dimensional coordinates and a second light intensity indicated by the approximate curve or the approximate curved surface exceeds an allowable value.

3 Claims, 3 Drawing Sheets

INSPECTING UNIT

BACKGROUND OF THE INVENTION

Field of the Invention

The present invention relates to an inspecting unit used in a laser processing apparatus.

Description of the Related Art

A wafer having a plurality of devices such as integrated circuits (ICs) or large-scale integration (LSI) formed on a top surface thereof so as to be demarcated by a plurality of intersecting planned dividing lines is divided into individual device chips by a dicing apparatus or a laser processing apparatus. The divided device chips are used in electric apparatuses such as mobile telephones or personal computers.

The dicing apparatus is configured to include a holding unit that holds the wafer, a cutting unit rotatably fitted with a cutting blade for cutting the wafer held by the holding unit, and a feeding mechanism that processing-feeds the holding unit and the cutting unit relative to each other. The dicing apparatus can divide the wafer into the individual device chips with high accuracy (see Japanese Patent Laid-Open No. 2001-358093, for example).

The laser processing apparatus is configured to include a holding unit that holds the wafer, a laser beam irradiating unit that irradiates the wafer held by the holding unit with a laser beam, and a feeding mechanism that processing-feeds the holding unit and the laser beam irradiating unit relative to each other. The laser processing apparatus can divide the wafer into the individual device chips with high accuracy, and form starting points at a time of dividing the wafer into the individual device chips (see Japanese Patent Laid-Open No. 2011-067840, for example).

SUMMARY OF THE INVENTION

However, the laser beam irradiating unit of the above-described laser processing apparatus is configured to include a laser oscillator that emits the laser beam, and an optical system (a reflecting mirror, a lens, a beam splitter, a diffraction grating, a cover glass, a spatial phase modulating element, a mask, and the like) including a condenser that guides and condenses the laser beam emitted by the laser oscillator. When there is a dirt, a flaw, or an abnormality in the optical system or the condenser, a distortion occurs in a shape of a spot of the laser beam, and consequently the laser beam irradiating unit cannot perform highly accurate processing. The abnormality of the optical system includes, for example, a distortion caused by an expansion of the lens constituting the optical system or the like, a displacement from a position in which the lens is to be disposed, a malfunction of the spatial phase modulating element, and the like.

It is accordingly an object of the present invention to provide an inspecting unit that makes it possible to recognize in advance that there is a dirt, a flaw, or an abnormality that causes a problem in laser processing in the optical system of a laser beam irradiating unit.

In accordance with an aspect of the present invention, there is provided an inspecting unit for use in a laser processing apparatus, the laser processing apparatus including a laser oscillator configured to emit a laser beam and an optical system including a condenser configured to guide and condense the laser beam emitted by the laser oscillator. The inspecting unit includes a camera configured to image a spot of the laser beam, and a processing unit configured to generate a light intensity at two-dimensional coordinates of an X-coordinate and a Y-coordinate corresponding to a two-dimensional image imaged by the camera, the processing unit including a determining unit configured to generate a three-dimensional approximate curve or an approximate curved surface such that the light intensity corresponding to the two-dimensional coordinates is set as a Z-coordinate, and determine that there is a dirt, a flaw, or an abnormality in the optical system on an optical path on the laser oscillator side of a position at which the spot is imaged, when a difference between the light intensity of the Z-coordinate corresponding to the two-dimensional coordinates and a light intensity indicated by the approximate curve or the approximate curved surface exceeds an allowable value.

Preferably, the inspecting unit includes a display unit configured to display the two-dimensional image processed by the processing unit, and the approximate curve or the approximate curved surface is two-dimensionally displayed on the display unit. Preferably, the two-dimensional coordinates are rotated, and the approximate curve or the approximate curved surface is two-dimensionally displayed.

The inspecting unit in accordance with the present invention makes it possible to recognize in advance that there is a dirt, a flaw, or an abnormality such as causes a problem in laser processing in the optical system (the condenser, the optical system, a reflecting mirror, and the like) on the optical path on the laser oscillator side of the position at which the spot is imaged. It is therefore possible to prompt for maintenance such as cleaning, repair, or replacement, and thereby maintain highly accurate processing.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
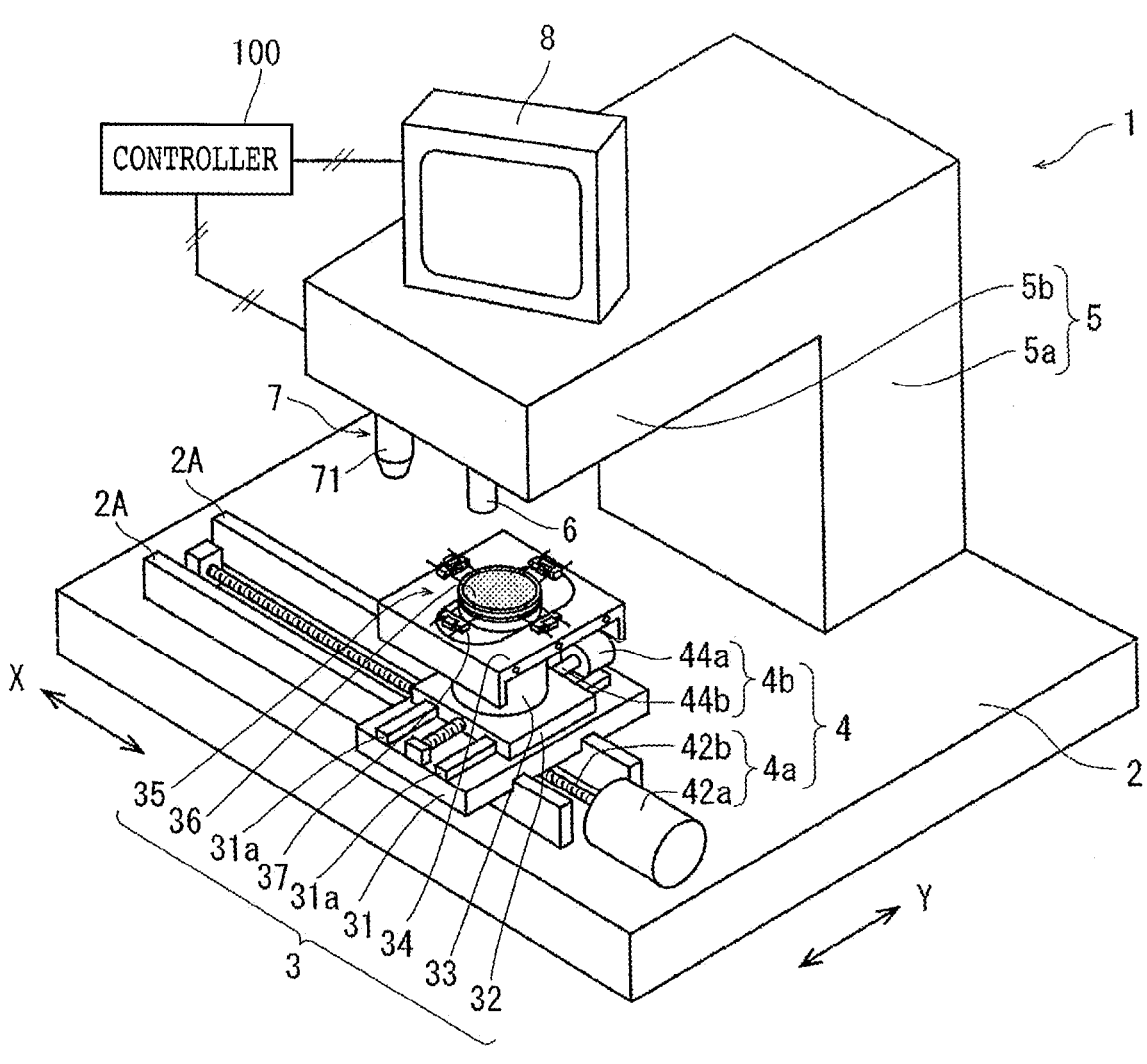
FIG. 1 is a general perspective view of a laser processing apparatus including an inspecting unit according to a present embodiment.

An inspecting unit according to an embodiment of the present invention will hereinafter be described in detail with reference to the accompanying drawings. FIG. 1 represents a general perspective view of a laser processing apparatus 1 provided with an inspecting unit 9 (see FIG. 2) according to the present embodiment to be described later. The laser processing apparatus 1 illustrated in the figure includes at least a laser beam irradiating unit 7 that irradiates a workpiece held by a holding unit 3 with a laser beam.

Figure 2:
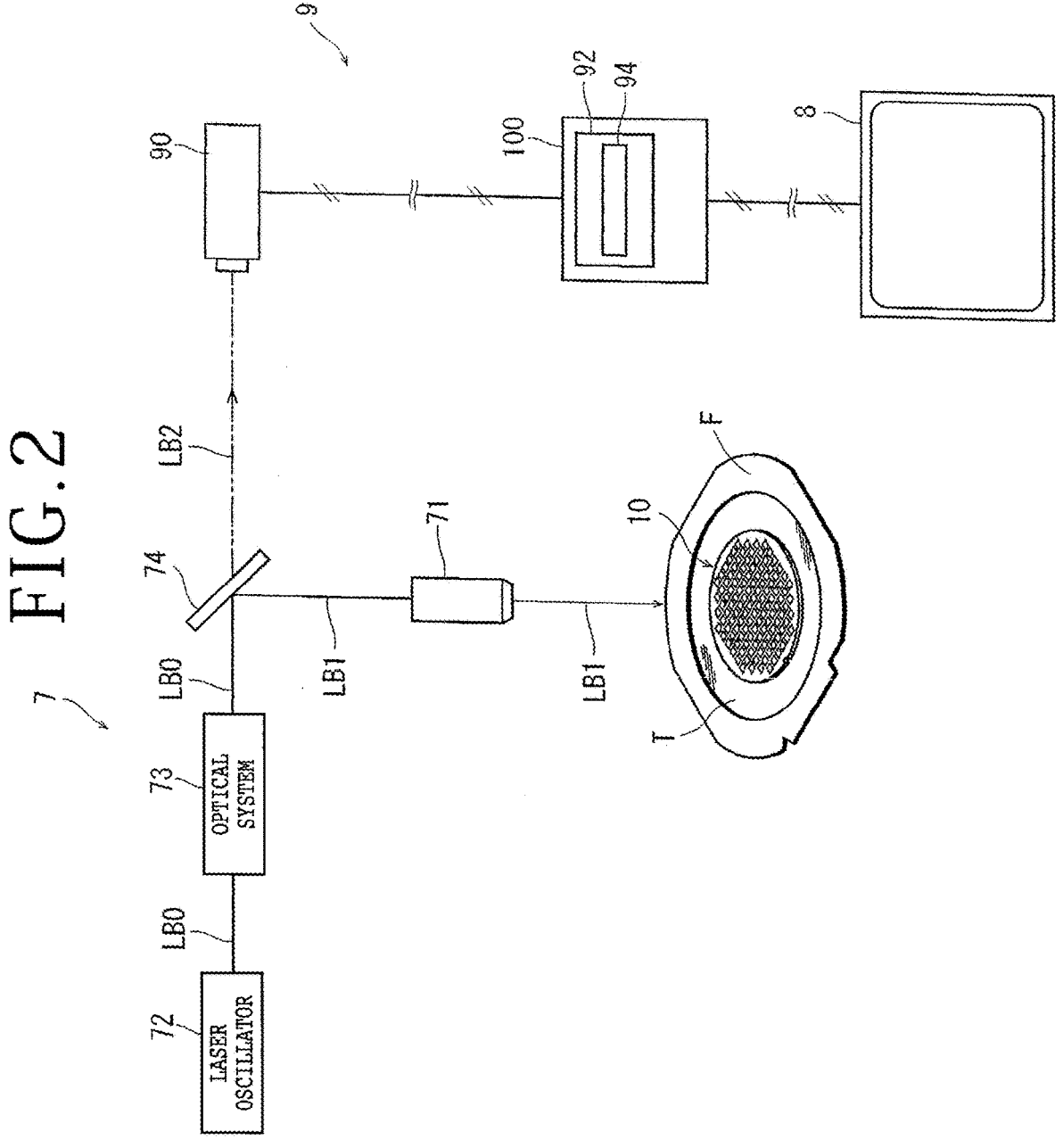
FIG. 2 is a block diagram illustrating an optical system of a laser beam irradiating unit and the inspecting unit arranged in the laser processing apparatus illustrated in FIG. 1.

As illustrated in FIG. 2, the laser beam irradiating unit 7 includes a laser oscillator 72 that emits a laser beam, a condenser 71 that condenses the laser beam emitted by the laser oscillator 72, and irradiates the workpiece (silicon wafer 10 in the present embodiment) held by the holding unit 3 with the laser beam, an optical system 73 arranged between the laser oscillator 72 and the condenser 71, and a reflecting mirror 74 that reflects a laser beam LB0 emitted by the laser oscillator 72 and applied thereto via the optical system 73, and applies a laser beam LB1 to the condenser 71. Though not illustrated in detail, the optical system 73 illustrated in the figure can include, for example, a reflecting mirror, a lens, a beam splitter, a diffraction grating, a cover glass, a spatial phase modulating element, a mask, and the like. The configuration of the optical system 73 is selected as appropriate according to processing conditions at a time of processing the workpiece by the laser beam irradiating unit 7, the material of the workpiece, and the like. Incidentally, the "optical system" in the present invention includes not only the optical system 73 illustrated in the figure but also the condenser 71 and the reflecting mirror 74 described above. In addition, the wafer 10 processed in the present embodiment includes a device region in which a plurality of devices are formed in a center of a top surface of the wafer 10 and a peripheral surplus region surrounding the device region. The wafer 10 is made integral with an annular frame F via an adhesive tape T, as illustrated in the figure.

Returning to FIG. 1 and continuing the description, the laser processing apparatus 1 according to the present embodiment is formed on a base 2, and, in addition to the above-described configuration, includes an alignment unit 6 that images the workpiece held by the holding unit 3 and performs alignment, a moving mechanism 4 that moves the holding unit 3, a frame body 5 constituted by a vertical wall portion 5a erected on a side of the moving mechanism 4 and a horizontal wall portion 5b extending in a horizontal direction from an upper end portion of the vertical wall portion 5a, a display unit 8, and a controller 100.

The holding unit 3 is means for holding the wafer 10 as a workpiece. More specifically, as illustrated in FIG. 1, the holding unit 3 includes a rectangular X-axis direction movable plate 31 mounted on the base 2 so as to be movable in an X-axis direction, a rectangular Y-axis direction movable plate 32 mounted on the X-axis direction movable plate 31 so as to be movable in a Y-axis direction, a cylindrical column 33 fixed to the upper surface of the Y-axis direction movable plate 32, a rectangular cover plate 34 fixed to an upper end of the column 33, and a chuck table 35 that extends upward through an elongated hole formed in the cover plate 34. The chuck table 35 is configured to be rotatable by a rotational driving mechanism not illustrated in the figure that is housed within the column 33. A circular suction chuck 36 that forms a holding surface by a member having air permeability is disposed in the upper surface of the chuck table 35. The suction chuck 36 is connected to suction means not illustrated in the figure by a flow passage that passes through the column 33. Four clamps 37 that hold the annular frame F supporting the above-described wafer 10 when the wafer 10 is held by the chuck table 35 are arranged at equal intervals on the periphery of the suction chuck 36. The wafer 10 can be fixed to the chuck table 35 by sucking the wafer 10 with a negative pressure generated in the upper surface of the suction chuck 36 by actuating the suction means, and by gripping the annular frame F by the clamps 37.

The moving mechanism 4 includes an X-axis moving mechanism 4a for moving the holding unit 3 in the X-axis direction and a Y-axis moving mechanism 4b for moving the holding unit 3 in the Y-axis direction orthogonal to the X-axis direction. The X-axis moving mechanism 4a converts rotary motion of a motor 42a into rectilinear motion via a ball screw 42b, and transmits the rectilinear motion to the X-axis direction movable plate 31. The X-axis moving mechanism 4a thereby moves the X-axis direction movable plate 31 in the X-axis direction along a pair of guide rails 2A and 2A arranged along the X-axis direction on the base 2. The Y-axis moving mechanism 4b converts rotary motion of a motor 44a into rectilinear motion via a ball screw 44b, and transmits the rectilinear motion to the Y-axis direction movable plate 32. The Y-axis moving mechanism 4b thereby moves the Y-axis direction movable plate 32 in the Y-axis direction along a pair of guide rails 31a and 31a arranged along the Y-axis direction on the X-axis direction movable plate 31.

The horizontal wall portion 5b of the frame body 5 houses an inspecting unit 9 according to the present embodiment in addition to the optical system constituting the laser beam irradiating unit 7 described with reference to FIG. 2. The condenser 71, which constitutes a part of the laser beam irradiating unit 7, and condenses the laser beam to irradiate the chuck table 35 with the laser beam, is disposed on the lower surface side of a distal end portion of the horizontal wall portion 5b. On the lower surface side of the distal end portion of the horizontal wall portion 5b, the alignment unit 6 is disposed at a position adjacent in the X-axis direction to the condenser 71. The alignment unit 6 is imaging means for imaging the wafer 10 held by the holding unit 3 to detect the position and orientation of the wafer 10, a processing position to be irradiated with the laser beam, and the like.

The controller 100 is constituted by a computer. The controller 100 includes a central processing unit (CPU) that performs arithmetic processing according to a control program, a read-only memory (ROM) that stores the control program and the like, a readable and writable random access memory (RAM) for temporarily storing a detected detection value, an arithmetic result, and the like, an input interface, and an output interface (details thereof are not illustrated). The controller 100 is connected with the above-described alignment unit 6, the display unit 8, the moving mechanism 4 including the X-axis moving mechanism 4a and the Y-axis moving mechanism 4b, and the like. The information of image data imaged by the alignment unit 6 is stored in an appropriate memory, and is displayed on the display unit 8.

As illustrated in FIG. 2, the inspecting unit 9 configured on the basis of the present invention is attached to the laser beam irradiating unit 7 of the laser processing apparatus 1 according to the present embodiment.

The inspecting unit 9 includes a camera 90 and a processing unit 92 that generates a light intensity at the two-dimensional coordinates of an X-coordinate and a Y-coordinate corresponding to a two-dimensional image imaged by the camera 90. The laser beam LB0 emitted by the laser oscillator 72 of the laser beam irradiating unit 7 described above hits the reflecting mirror 74 via the optical system 73 and is applied as the laser beam LB1 for processing to the condenser 71 side, and a part of the laser beam LB0 passes through the reflecting mirror 74 and becomes a laser beam LB2. The camera 90 images the spot of the laser beam LB2 passed through the reflecting mirror 74. The laser beam LB2 is generally-called leakage light, and is a laser beam weakened to a power density at such a level as not to damage a light receiving element of the camera 90.

The processing unit 92 according to the present embodiment is configured in the controller 100 that controls various actuating units of the laser processing apparatus 1. The processing unit 92 generates a light intensity at the two-dimensional coordinates of an X-coordinate and a Y-coordinate corresponding to the two-dimensional image representing the shape of the spot imaged by the camera 90. In addition, the processing unit 92 includes a determining unit 94 that generates a three-dimensional approximate curve or approximate curved surface having, as a Z-coordinate, the light intensity generated so as to correspond to the two-dimensional coordinates, determines whether or not a difference between a light intensity $Z1$ of the z-coordinate as an actually measured value corresponding to the two-dimensional coordinates and a light intensity $Z2$ indicated by the approximate curve or the approximate curved surface generated by the processing unit 92 ($|Z1-Z2|$) exceeds an allowable value, and determines that there is a dirt, a flaw, or an abnormality in the optical system on an optical path on the laser oscillator 72 side of a position at which the spot is imaged when determining that the difference exceeds the allowable value (details will be described later).

The laser processing apparatus 1 according to the present embodiment substantially includes the configuration as described above. According to the inspecting unit 9 described above, an inspection of the laser beam irradiating unit 7 of the laser processing apparatus 1 can be performed in the following mode, for example.

First, an unprocessed wafer 10 supported by the annular frame F via the adhesive tape T is transported to the laser processing apparatus 1 described above. The wafer 10 is mounted onto the chuck table 35 of the holding unit 3, and the wafer 10 is fixed to the chuck table 35 by sucking the wafer 10 with a negative pressure generated in the suction chuck 36 by actuating the suction means, and by gripping the annular frame F by the clamps 37.

The moving mechanism 4 described above is actuated to move the chuck table 35 to immediately below the alignment unit 6, the wafer 10 fixed to the chuck table 35 is imaged to detect the processing position, and a rotational position of the chuck table 35 is adjusted. Next, the moving mechanism 4 is actuated to position the chuck table 35 immediately below the condenser 71 of the laser beam irradiating unit 7. Here, the peripheral surplus region in which no devices are formed on the top surface of the wafer 10 is positioned immediately below the condenser 71. Next, the laser beam irradiating unit 7 is actuated to emit the laser beam LB0 by the laser oscillator 72. As described with reference to FIG. 2, a part of the laser beam LB0 emitted by the laser oscillator 72 of the laser beam irradiating unit 7 passes through the reflecting mirror 74, and becomes the laser beam LB2 whose power density is reduced. The spot of the laser beam LB2 is imaged by the camera 90.

The above-described processing unit 92 generates, from the two-dimensional image of the laser beam LB2 imaged by the camera 90, a light intensity corresponding to each coordinate position of an X-coordinate and a Y-coordinate of the two-dimensional image. The X-coordinate and the Y-coordinate of the two-dimensional image are coordinates possessed by the camera 90 when the spot of the laser beam LB2 is imaged.

Figure 3:
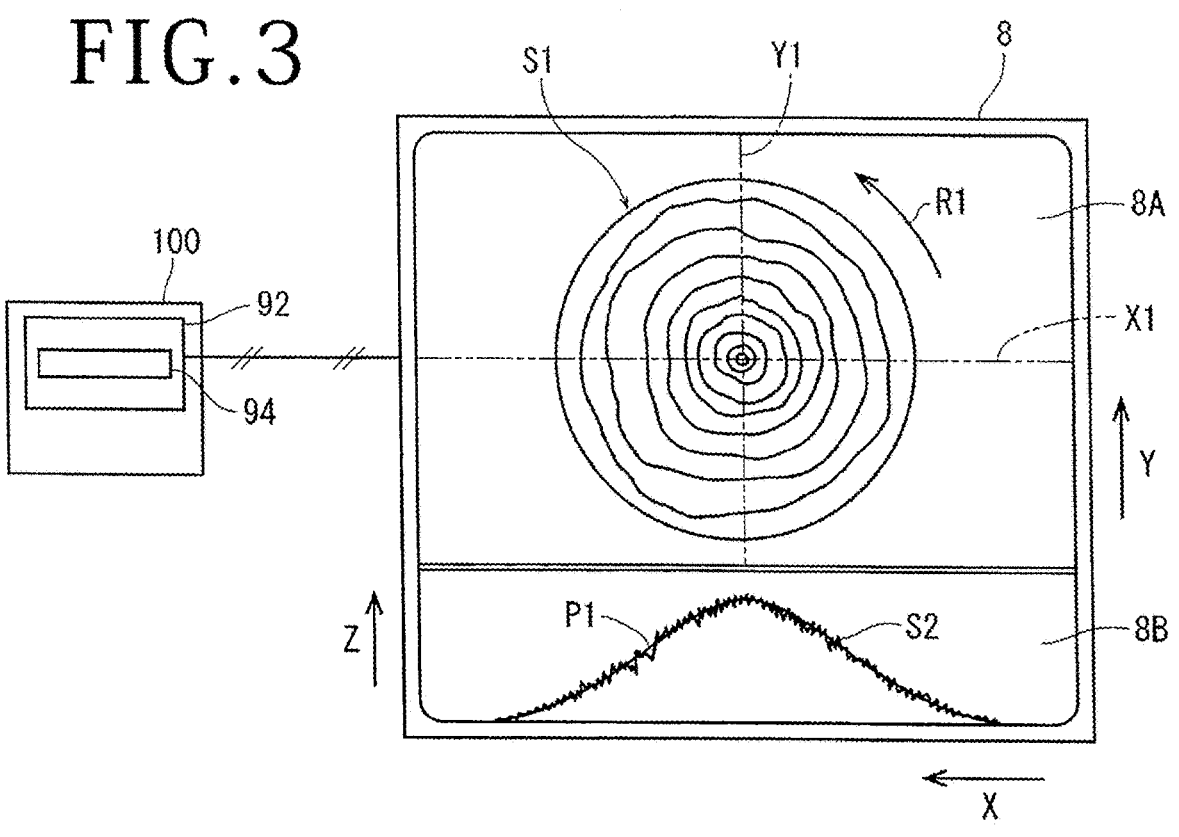
FIG. 3 is a conceptual diagram illustrating a display state of a display unit in a case where an inspection is performed by the inspecting unit illustrated in FIG. 2, and there is no dirt or flaw or abnormality in the optical system.

On the basis of the light intensity of each coordinate position at an X-coordinate and a Y-coordinate corresponding to the two-dimensional image representing the shape of the spot imaged by the camera 90, the processing unit 92 generates three-dimensional information having the light intensity as a Z-coordinate. As illustrated in FIG. 3, the display unit 8 is connected to the controller 100 including the processing unit 92, and a two-dimensional image S1 based on the three-dimensional information generated by the processing unit 92 is displayed in a first display region 8A of the display unit 8. The first display region 8A of the display unit 8 displays a straight line X1 passing through a center of the first display region 8A and indicating the horizontal direction and a straight line Y1 orthogonal to the straight line X1 at the center of the first display region 8A (both are represented by a chain double-dashed line). The image S1 displays a state in which a point of intersection of the straight line X1 and the straight line Y1 and the optical axis of the laser beam LB2 coincide with each other. In an initial state, an X-axis and a Y-axis for identifying the image S1 representing the shape of the spot imaged by the camera 90 are displayed so as to coincide with the straight line X1 and the straight line Y1 illustrated on the display unit 8.

The image S1 displayed in the first display region 8A illustrated in FIG. 3 illustrates Z-coordinate positions of the same light intensity by connecting the Z-coordinate positions to each other by a contour line for the convenience of description. In actuality, however, the level of the light intensity is indicated by a change in color on the basis of the three-dimensional information having the light intensity at an X-coordinate and a Y-coordinate in the image S1 as the value of a Z-coordinate. In the image S1 illustrated in the figure, the contour line of a projection region is indicated by a solid line. However, if there is a region in which light intensity values form a recess, the contour line is indicated by a broken line (see FIG. 4).

In addition, in the present embodiment, a two-dimensional image S2 indicating, by Z-coordinates, light intensity values of the image S1 that the straight line X1 indicating the horizontal direction passes through in the first display region 8A is illustrated in a second display region 8B set on a lower side of the first display region 8A. The two-dimensional image S2 illustrated in the second display region 8B can be said to be a generally-called sectional view obtained by cutting, along the straight line X1, the image S1 formed on the basis of the three-dimensional information and illustrated in the first display region 8A.

As described above, the processing unit 92 generates a three-dimensional approximate curve or approximate curved surface on the basis of the three-dimensional information indicating, by Z-coordinates, light intensity values corresponding to the two-dimensional coordinates of the image S1. In the present embodiment, a two-dimensional approximate curve P1, which is generated on the basis of the above-described three-dimensional approximate curve or approximate curved surface, is generated so as to correspond to the two-dimensional image S2 illustrated in the second display region 8B in the display unit 8 of FIG. 3, and the two-dimensional approximate curve P1 is displayed in the second display region 8B together with the two-dimensional image S2 described above. The approximate curve P1 is preferably a curve approximated by a smooth normal distribution curve.

The processing unit 92 includes the determining unit 94 that computes a difference between the light intensity $Z1$ in the two-dimensional image S2 on the basis of an actually measured value illustrated in the second display region 8B and the light intensity $Z2$ in the approximate curve P1 described above ($|Z1-Z2|$), and determines whether or not the difference exceeds an allowable value. Here, the allowable value is a value set to detect that there is a dirt, a flaw, or an abnormality in the optical system on the optical path on the laser oscillator 72 side of the position at which the spot is imaged by the camera 90 on the basis of a significant deviation of the light intensity Z1 based on the actually measured value at each coordinate position from the light intensity Z2 of the approximate curve P1. The allowable value is a value set as appropriate by an experiment carried out in advance or the like.

Here, the computation of the difference by the determining unit 94 is repeatedly performed while the two-dimensional coordinates of the image S1 displayed in the first display region 8A in the display unit 8 of FIG. 3 are rotated at predetermined angular intervals in a direction indicated by an arrow R1. Then, whether or not there is a region in which the computed difference exceeds the allowable value is detected at each rotational angle. The entire area of the spot imaged by the camera 90 can be inspected by rotating the two-dimensional coordinates of the image S1 displayed in the first display region 8A by 360° in the direction indicated by the arrow R1.

In the inspection performed by the processing unit 92 illustrated in FIG. 3, the difference exceeding the allowable value is not detected at any angle. Hence, it is determined that there is no dirt or flaw or abnormality in any part of the optical system present on the optical path on the laser oscillator 72 side of the position at which the spot is imaged by the camera 90, and it is determined that laser processing using the laser beam LB1 is performed excellently. A result of the determination is stored in an appropriate memory of the processing unit 92, and is displayed at some position of the display unit 8 as needed.

Figure 4:
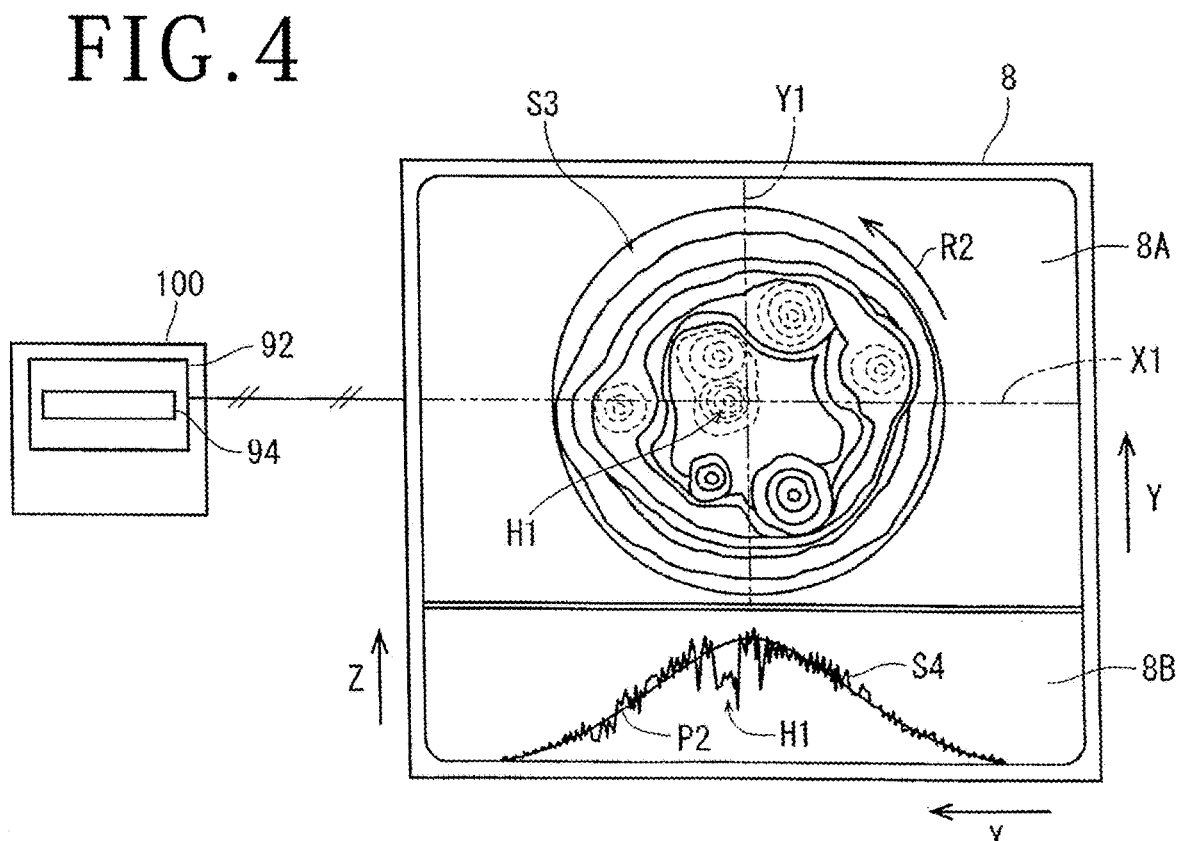
FIG. 4 is a conceptual diagram illustrating a display state of the display unit in a case where an inspection is performed by the inspecting unit illustrated in FIG. 2, and there is a dirt, a flaw, or an abnormality in the optical system.

FIG. 4 illustrates a result in a case where an inspection using the above-described processing unit 92 is performed when there is a dirt, a flaw, or an abnormality in the optical system of the laser beam irradiating unit 7 described above.

The first display region 8A of the display unit 8 illustrated in FIG. 4 illustrates an image S3 indicating the shape and light intensity of the spot imaged by the camera 90 at the position illustrated in FIG. 2. In addition, together with a two-dimensional image S4 indicating, as a Z-coordinate, a light intensity corresponding to an X-coordinate and a Y-coordinate of the image S3 which coordinates coincide with the straight line X1 in the first display region 8A, the second display region 8B displays an approximate curve P2 generated on the basis of the three-dimensional approximate curve or approximate curved surface generated on the basis of the three-dimensional information indicating, by a Z-coordinate, the value of the light intensity corresponding to the two-dimensional coordinates of the image S3. As with the approximate curve P1 described above, the approximate curve P2 is also preferably a curve approximated by a smooth normal distribution curve, and is displayed so as to be superimposed on the image S4.

Then, the determining unit 94 computes the difference between the light intensity Z1 indicated in the two-dimensional image S4 described above and the light intensity Z2 indicated by the two-dimensional approximate curve P2 (|Z1-Z2|), and determines whether or not the difference (|Z1-Z2|) is larger than the allowable value. In the inspection illustrated in FIG. 4, as is understood from the image S3 displayed in the first display region 8A of the display unit 8, a plurality of recess portions representing a region of weak light intensity are indicated by contour lines as broken lines. For example, it is determined that the difference (|Z1-Z2|) is larger than the allowable value in a region of a recess portion H1 coinciding with the straight line X1. This result is transmitted to the processing unit 92 and is stored in an appropriate memory.

Also in the inspection illustrated in FIG. 4, while the two-dimensional coordinates of the image S3 displayed in the first display region 8A are rotated by 360° in a direction indicated by an arrow R2, the determining unit 94 computes the difference between the light intensity Z1 indicated by the two-dimensional image S4 and the light intensity Z2 indicated by the approximate curve P2 described above in an entire area of X-coordinates and Y-coordinates forming the image S3. Each time it is determined that the difference is larger than the allowable value, the result is transmitted to the processing unit 92, and is stored in an appropriate memory together with the X-coordinates and Y-coordinates of the region in which the difference is determined to be larger than the allowable value. Thus, the inspection is completed in the entire area of the X-coordinates and the Y-coordinates forming the image S3. As described above, in a case where there is a region in which the difference is determined to be larger than the allowable value, the determining unit 94 determines that there is a dirt, a flaw, or an abnormality in the optical system on the optical path on the laser oscillator 72 side of the position at which the spot is imaged. As a result, information to the effect that processing using the laser beam LB2 may not be performed normally is transmitted to the controller 100, and a warning is issued to an operator as needed. The warning can be given by display on the display unit 8, the actuation of a warning buzzer, the blinking of a red lamp, and the like. It is thereby possible to prompt for the maintenance of the optical system disposed on the optical path on the laser oscillator 72 side of the position at which the spot is imaged. In addition, in a case where the difference is determined to be larger than the allowable value in a plurality of regions, information regarding the number of the regions in which the difference is determined to be larger than the allowable value, the area of the regions in which the difference is determined to be larger than the allowable value, or a ratio of the area is preferably displayed at a time of the warning.

Incidentally, in the foregoing embodiment, the spot of the laser beam LB2 transmitted through the reflecting mirror 74 is imaged by the camera 90 of the inspecting unit 9, and the above-described inspection is performed. However, the present invention is not limited to this. For example, the above-described inspecting unit 9 may be disposed together with a branching unit (not illustrated) that branches a part of the laser beam LB1 on the optical path of the laser beam LB1 applied from the condenser 71 to the wafer 10, the spot of the laser beam branched by the branching unit and reduced in power density may be imaged, and an inspection may be performed by a procedure similar to that of the inspection described above. In that case, the condenser 71 can be positioned on the optical path on the laser oscillator 72 side of the position at which the spot is imaged, so that the condenser 71 can be included in the targets of the inspection by the inspecting unit 9.

According to the foregoing embodiment, it is possible to recognize in advance that there is a dirt, a flaw, or an abnormality such as causes a problem in laser processing in the optical system (the condenser 71, the optical system 73, the reflecting mirror 74, and the like) on the optical path on the laser oscillator 72 side of the position at which the spot is imaged in the laser beam irradiating unit 7. It is therefore possible to prompt maintenance such as the cleaning, repair, or replacement of the optical system, and thereby maintain highly accurate processing.

Incidentally, when the inspecting unit 9 configured on the basis of the present invention is used, an inspection can be performed even while the laser processing on the wafer 10 is being performed by the above-described laser beam irradiating unit 7.

In addition, in the foregoing embodiment, the display unit 8 that displays the two-dimensional image processed by the processing unit 92 is provided, an approximate curve is two-dimensionally displayed in the second display region 8B of the display unit 8, the two-dimensional coordinates of the image displayed in the first display region 8A are rotated by 360°, and whether or not the difference between the light intensity Z1 of the Z-coordinate corresponding to the two-dimensional coordinates and the light intensity Z2 indicated by the approximate curve exceeds the allowable value is determined in the entire area of the X-coordinates and the Y-coordinates forming the image. However, the present invention is not limited to this. For example, the processing unit 92 may generate an approximate curved surface corresponding to the image generated on the basis of the three-dimensional information having a light intensity at each coordinate position as the value of a Z-coordinate, compute, at one go, differences between light intensities in the entire area of the two-dimensional image displayed in the first display region 8A and light intensities in the entire area of the approximate curved surface generated on the basis of the light intensities corresponding to the respective coordinate positions of the two-dimensional image, and determine whether or not the difference between the light intensity Z1 of the z-coordinate corresponding to each two-dimensional coordinate and the light intensity Z2 indicated by the approximate curve exceeds the allowable value at each coordinate position.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. An inspecting unit for use in a laser processing apparatus, the laser processing apparatus including a laser oscillator configured to emit a laser beam and an optical system including a condenser configured to guide and condense the laser beam emitted by the laser oscillator, the inspecting unit comprising:

a camera configured to image a spot of the laser beam; and a processing unit configured to generate a light intensity at two-dimensional coordinates of an X-coordinate and a Y-coordinate corresponding to a two-dimensional image imaged by the camera, the processing unit including a determining unit configured to generate a three-dimensional approximate curve or an approximate curved surface such that the light intensity corresponding to the two-dimensional coordinates is set as a Z-coordinate, and determine that there is a dirt, a flaw, or an abnormality in the optical system on an optical path on the laser oscillator side of a position at which the spot is imaged, when a difference between the light intensity of the Z-coordinate corresponding to the two-dimensional coordinates and a light intensity indicated by the approximate curve or the approximate curved surface exceeds an allowable value.

2. The inspecting unit according to claim 1, further comprising:

a display unit configured to display the two-dimensional image processed by the processing unit, wherein the approximate curve or the approximate curved surface is two-dimensionally displayed on the display unit.

3. The inspecting unit according to claim 2, wherein the two-dimensional coordinates are rotated, and the approximate curve or the approximate curved surface is two-dimensionally displayed.

\* \* \* \* \*